Figure 1:
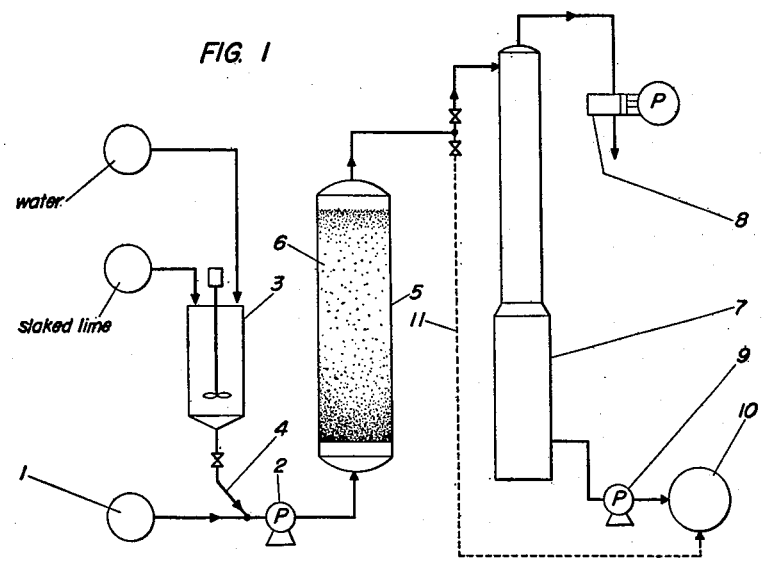

Jan. 29, 1963 TSUNEO KATO ETAL 3,075,828
TREATMENT OF SEA WATER

Filed Dec. 21, 1959 2 Sheets-Sheet 1

INVENTORS
TSUNEO KATO
MASANORI ITO
IWAO KANNO
KENJI TAKEO

BY
Wenderoth, Lind & Ponack
Attys.

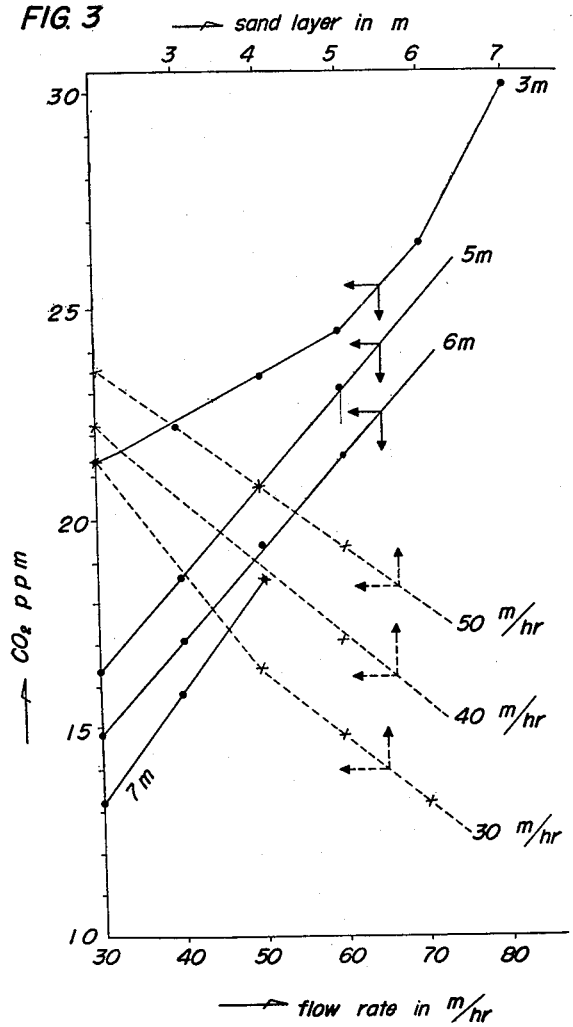

United States Patent Office 3,075,828
Patented Jan. 29, 1963

3,075,828
TREATMENT OF SEA WATER
Tsuneo Kato, Iwaki-shi, Masanori Ito and Iwao Kanno, Minamata-shi, and Kenji Takeo, Iwaki-shi, Japan, assignors to Asahi Kasei Kogyo Kabushiki Kaisha, Tokyo, Japan, a corporation of Japan
Filed Dec. 21, 1959, Ser. No. 860,924
Claims priority, application Japan Jan. 21, 1959
4 Claims. (Cl. 23—201)

This invention relates to a method of removing carbonic acid component from sea water containing the same. In a more specific aspect, this invention relates to a method of removing carbonic acid component from sea water, which comprises adding a slaked lime solution in an at least stoichiometric amount to carbonic acid component contained in sea water to said water and immediately thereafter, while stirring, passing the resulting suspension upwardly through a sand layer at such rate as to have the sand particles of said layer fluidized, whereby the carbonic acid component in sea water is deposited as calcium carbonate on the surfaces of the sand particles. The term "carbonic acid component" used herein comprehends carbon dioxide $CO_2$ and bicarbonates which may be present as bicarbonate ion $HCO_3^-$ in a solution form.

Usually chemical corrosion of steel-made apparatus is a serious problem in a particular case of the salt manufacture by direct boiling of sea water as well as in a case wherein sea water is employed as cooling water. In the production of magnesium from sea water, it is also an essential problem to remove carbonic acid component from sea water as starting material. In a conventional method of removing carbonic acid component from sea water, slaked lime is added to sea water in an amount of 100–400 mgr./l. to form calcium carbonate, and the sea water that is a suspension of the above calcium carbonate is passed in a sedimentation basin or a thickener having a large capacity and a large basic area, in said basin or said thickener the calcium carbonate crystal is sedimented (cf. Industrial Chemist, Dec. 1949, London). In such conventional method, however, 3 to 5% of magnesium contained in sea water is converted into magnesium hydroxide, which together with calcium carbonate is sedimented in a sedimentation basin resulting in the loss of magnesium.

It is accordingly an object of the present invention to provide a commercial method of removing carbonic acid component from sea water containing the same. Another object of the present invention is to provide a method of removing carbonic acid component from sea water used as starting material in the production of magnesium without a substantial loss of magnesium. Other objects, features and advantages which are comprehended in the present invention will be apparent from the description and claims which follow.

Figure 2:
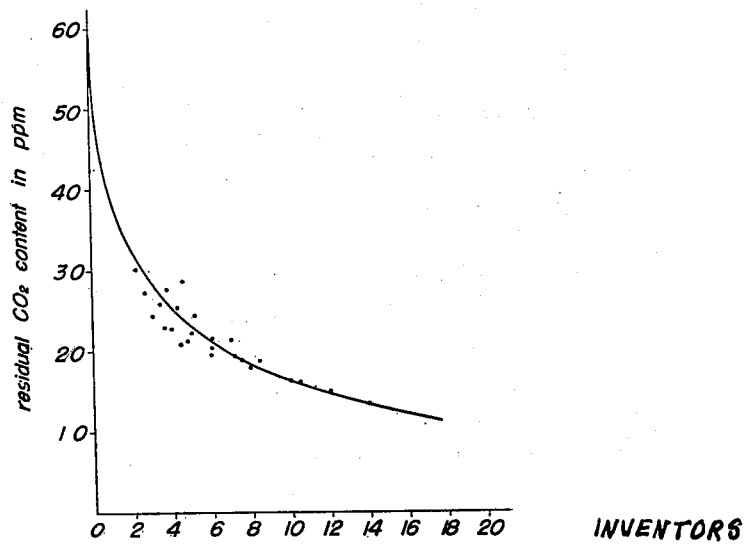

Referring to the accompanying drawing: FIG. 1 shows a suitable apparatus for carrying out one embodiment of the present invention. FIG. 2 is the rectangular coordinates showing the relationship between a contact period of a sea water-slaked lime mixture in fluidized sand particles and a content of carbonic acid component remaining in sea water, and FIG. 3 is the rectangular coordinates showing the relationship between a feeding velocity of the above said mixture and a content of carbonic acid components remaining in sea water.

In general, sea water contains 70 to 80 p.p.m. of carbonic acid component and has a pH of about 8.2 at 15° C. Herein such carbonic acid component which comprises mainly carbon dioxide $CO_2$ and bicarbonates (which may be present as bicarbonate ion $HCO_3^-$ in a solution form) may be converted into calcium carbonate by the addition of milk of lime to sea water, according to the reaction

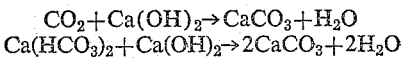

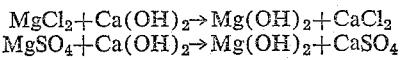

The solubility of the thus formed calcium carbonate may vary depending on a calcium ion concentration and a temperature at the time, but it usually is about 10 to 12 p.p.m. as carbon dioxide. If milk of lime is further added to the sea water, magnesium hydroxide may be formed by the following reaction:

$$MgCl_2 + Ca(OH)_2 \rightarrow Mg(OH)_2 + CaCl_2$$
$$MgSO_4 + Ca(OH)_2 \rightarrow Mg(OH)_2 + CaSO_4$$

In order to have the decreased carbonic acid content in sea water less than 15 p.p.m., it is necessary to add milk of lime in a slightly excessive amount and more specifically to such an extent that magnesium hydroxide precipitate is more or less formed.

Now in quantitative consideration of the above mentioned reaction, stoichiometric amount of slaked lime (calcium hydroxide) to be added to sea water containing 70 or 80 p.p.m. of carbonic acid component is $$70 \times 74/44 = 117.7 \text{ mgr./l. sea water or}$$
$$80 \times 74/44 = 134.5 \text{ mgr./l. sea water}$$

In the above chemical reaction, however, it is required to employ an excessive slaked lime, because carbonic acid component can not be entirely removed by the additon of a stoichiometric amount of slaked lime, and now it has been found that if slaked lime is used to such an extent that approximately 3 to 5% of magnesium contained in sea water is precipitated, carbonic acid component may be decreased to less than 15 p.p.m. In other words, when slaked lime is added to sea water at the proportion of 150 to 250 mgr./l., satisfactory result can be obtained. After the addition of a specified amount of slaked lime, the sea water should have a pH of about 10.0 to 10.3 and preferably a pH of about 10.15 to 10.20.

In accordance with a method of the present invention, sea water which has been admixed with milk of lime in such a manner as mentioned above is compulsorily passed through a sand-packed column upwardly and then recovered continuously through the top part of the said column. By our experiment it has now been observed that when sea water which has been added with milk of lime shortly before and which now comprises calcium carbonate and magnesium hydroxide in the supersaturated form is passed through a sand-packed column, calcium carbonate may be crystallized out to deposit on the surface of the sand particles, while magnesium hydroxide is flown out together with the water stream with the result that magnesium hydroxide scarcely remains on the sand particles. On the analysis of deposited mass it has been ascertained that the amount of magnesium hydroxide is less than 1% as based on the weight of calcium carbonate, that is negligibly small.

In the present invention, a velocity of sea water passing through a sand layer should be determined so as to fluidize the sand particles of the said layer. Also it is preferable that a time necessary for passing through a sand layer (a contact period between sea water and a sand layer) may be within the range of from 5 to 20 minutes. If the period is shorter than the above specified range, calcium carbonate in sea water fill be insufficiently crystallized out on the surface of the sand particles, and on the contrary, if the period is too long, magnesium hydroxide will be undesirably crystallized in addition to calcium carbonate. The variety of types of the sand, with which the above said sand layer is constituted, may include silica, river sand, sea sand, crusher-run stone, limestone powder, crushed dolomite ore and so forth, and these materials comprise $SiO_2$ as principal chemical component together with $Al_2O_3$ and $Fe_2O_3$. The sand having a particle size of 10–40 mesh (particle diameter 0.35–1.65 mm.) may be preferably employed.

In our experiment, a sand having the variety of particle size is employed and its result is shown in Table 1.

TABLE 1

| Sand particles used, mesh | Sand layer | | Residual $CO_2$ p.p.m. |
| --- | --- | --- | --- |
| | At static state, mm. | At fluidized state, mm. | |
| 10–20 | 1,660 | 1,790 | 28.76 |
| 20–40 | 1,660 | 1,980 | 27.83 |
| 40–60 | 1,660 | 2,520 | 26.18 |
| 60–80 | 850 | 2,500 | 27.46 |
| 10–20 | 2,320 | 2,500 | 25.94 |
| 20–40 | 1,940 | 2,500 | 26.93 |
| 40–60 | 1,660 | 2,520 | 26.18 |
| 60–80 | 850 | 2,500 | 27.46 |

NOTE.—The experiment was carried out at 13.5° to 14.5° C. 300 mg of slaked lime was added to one liter of sea water, and the flow rate of a slaked lime-sea water mixture was 30 m./hr.

By the above table it is indicated that at the same height of static sand layers the smaller particle size of sand gives the lower content of carbonic acid component remaining in sea water, and that at the same height of fluidized sand layers the greater particle size of sand gives the lower carbonic acid content.

The thickness, that is height, of a sand layer employed may be determined secund facie by the particle size of a sand used and the dimensions (diameter and height) of an apparatus. In a suitable embodiment of the present invention, a sand layer being 5 to 7 meters thick and consisting of a sand with the particle size of 10 to 40 mesh may be preferably used at the flowing rate of 0.5 to 0.7 meter per minute. When a sand layer is too low, there is easily happened a blow-through, and if a sand layer is too thick, the partial sedimentation of a fluidized sand may easily occur.

A fluidized sand layer of the present invention has a novelty in the fact that on the decarbonation process of the present invention a mixture of sea water and slaked lime is passed upwardly through the said sand layer.

As understood from the above indicated chemical equations, calcium carbonate is inclined to form a supersaturated solution by the mere admixture of calcium hydroxide with sea water, and therefore it is necessary for providing a considerable period of time and readily crystallizable conditions—a certain type of stimulus and/or an excessive addition of calcium hydroxide—to effect the crystallization of calcium carbonate. In a conventional method wherein a mixture of slaked lime and sea water is passed upwardly through a sand layer to effect the sedimentation of calcium carbonate crystal, there is a tendency to have a super-saturated solution of calcium carbonate, because of spontaneous (or unstimulated) crystallization, and accordingly calcium carbonate is scarcely crystallized. In a previously known sedimentation method sometimes it was experienced that supersaturation is disturbed employing a sand mixed with crushed limestone. In the method, however, the dead space between sand particles are gradually occupied with the calcium carbonate crystal grown on the surface of limestone, and therefore liquid ventilation is extremely prevented and during the lapse of time, such efficiency as destroying supersaturated state is extremely degraded. In the examination of the sand layer comprising crushed limestone at that time, it was occasionally observed that a slaked lime-sea water mixture is passed through only two or three hollows.

In sea water to which has been added slaked lime in accordance with the invention, calcium carbonate is not present in crystal form, but in a suspended state. Since the calcium carbonate is deposited as crystal on the surface of sand particles firstly when the said sea water is passed through the sand layer in a fluidized manner, calcium carbonate is not locally precipitated and it is easy separable from the sea water. Furthermore there is provided a stimulus for crystallization by blowing the sea water-slaked lime mixture upwardly through a fluidized sand layer, thereby to disturb completely the supersaturated state. Thus calcium carbonate is efficiently crystallized according to the invention.

As described hereinabove, calcium carbonate crystallized out on the sand particles of a sand layer in a sand-packed column naturally increases the size of the sand particles to inhibit the sand fluidization, and therefore it is necessary to change the sand at times. If two or more exchangeable sand-packed columns are employed, of course a continuous operation without interruption can be carried out.

Now the detailed explanation will be given with reference to the drawing as follows: In FIG. 1, there are shown a sea water tank 1, a rotary pump 2, a milk of lime storage vessel 3 and a conduit 4 of milk of lime, which is connected just adjacent to the pump 2. There are also provided a sand-packed column 5, a sand layer 6, a deairing tower 7, a vacuum pump 8, an exhaust pump 9, a vessel of treated sea water 10 and a short circuit conduit 11, which is connected to the deairing tower 7. In the apparatus of FIG. 1, milk of lime, fed into sea water as starting material at the position just before the pump 2, is well agitated by means of the pump to have a mixture which is subsequently passed through the sand-packed column 5 upwardly, whereby calcium carbonate is completely deposited on the sand particles while magnesium hydroxide is almost completely recovered together with the sea water stream which is flown over the top of the said column. The thus treated sea water usually contains less than 15 p.p.m. of carbonic acid component on the carbon dioxide ($CO_2$) basis. Since oxygen as well as nitrogen dissolved in sea water is hardly removed by passing through a sand-packed column, it is, if needed, necessary to pass the once treated sea water through the vacuum deairing tower 7 to remove about 90% of the said oxygen and nitrogen.

In FIG. 2, there is shown the relationship between a contact period of a sea water-milk of lime mixture with a fluidized sand layer and a content of the residual carbonic acid component in the invention. The data plotted herein are as follows:

| Contact period, minutes | 6 | 10 | 20 |
| --- | --- | --- | --- |
| Residual $CO_2$, p.p.m. | 20 | 15 | 10 | and these are observed in the experiment employing a sand with the particle size of 10–40 mesh and a mixture with the proportion of 180 mgr. $Ca(OH)_2$/l. sea water. From this FIG. 2 it should be understood that the contact period may be selected within the range of from about 5 to about 20 minutes, although it will be varied depending on a content of carbonic acid component in raw sea water.

In FIG. 3, there is shown the relationship between a flowing rate of the above said mixture and a residual $CO_2$ content. The data plotted on the curve of FIG. 3 are measured at room temperature (25° C.). As shown in FIG. 3, it is necessary to use a sand layer with the thickness of about 5 to 7 m. which is fluidized at a flowing rate of 30 to 40 m./hr. ($\approx$ 0.5 to 0.7 m./min.) in order to have a residual $CO_2$ content of 15 p.p.m.

Although in the invention wherein more than equivalent amount of milk of lime is added to sea water there is a slight disadvantage in view of an economical unit of slaked lime used, the invention will provide a great advantage in the production of magnesium from sea water, because of no loss of magnesium. Furthermore it is observed that in an apparatus of FIG. 1 corrosion on the steel pipe between the sea water tank 1 and the pump 2 is several times greater as compared with that of a steel pipe adjacent behind the sand-packed column. In this regard, such decarbonation procedures for sea water as according to the invention are very significant as pre-treatment of sea water used in certain cases, for instance the salt manufacture.

The following example, which is intended as informative and typical only and not in a limting sense, will illustrate the invention.

*Example*

Through the suction opening of a pump for sea water, milk of lime having the concentration of approximately 2 to 10%, pooled in a storage tank for milk of lime, was added to sea water at the proportion of 200 to 250 mgr., on the basis of slaked lime, per one liter of sea water. Immediately after passage through the pump, during which an intimate mixture of milk of lime and sea water was formed, the mixture having a pH of 10.15 to 10.17 at 15° C. at the neighbourhood of the exhaust end of the pump was continuously passed upwardly through a sand-packed column containing a sand layer with the thickness of 6 m. in such a manner as fluidizing the said layer. The flow rate was 0.6 m./min. The thus treated sea water, taken up through the opening at the top of the said column, may be used as it is or after passing through a deairing tower if needed, for the intended purpose.

To show the effect of a decarbonation process of the invention, the following analytical data will be referred to.

TABLE 2

|  | Sea water before passing through a sand-packed column | Sea water after passing through a sand-packed column | Sea water after passing through a deairing tower |
| --- | --- | --- | --- |
| pH | 10.16 | 9.8 | 9.7 |
| $Cl_2$ percent | 1.85 | 1.84 | 1.84 |
| CaO do | 0.07 | 0.06 | 0.06 |
| $CO_2$ p.p.m. | 57 | 15 | 14 |
| $O_2$ dissolved p.p.m. | 11 | 11 | 1.0 |
| $N_2$ dissolved p.p.m. | 30 | 30 | 4.0 |

The sea water from which carbonic acid and the carbonates (inclusive of carbonates) has been removed may be particularly suitable for use as starting material in the production of magnesium hydroxide which is used as raw material of magnesia clinker. In the production of high grade magnesia clinker calcium carbonate should be removed as possible, and in the regard, the following data will show the significance of the invention:

TABLE 3

|  | Purity of $Mg(OH)_2$ (expressed in CaO/MgO, percent) | |
| --- | --- | --- |
|  | Produced from sea water treated in a method of the invention | Produced from sea water treated in a conventional method or sedimentation process |
| Magnesium hydroxide just recovered from a thickener | 3.48 | 6.04 |
| Magnesium hydroxide recovered from a thickener and then water-washed | 1.66 | 4.22 |

Further, in order to show an economical value of the invention, the required amount of sea water as well as slaked lime to be required for the production of one ton of magnesium hydroxide are shown in the following table.

TABLE 4

|  | The amount of starting materials in the production of one part of $Mg(OH)_2$ | |
| --- | --- | --- |
|  | By the invention | By a conventional method |
| Sea water | 480 | 534 |
| Slaked lime | 1.49 | 1.56 |

What we claim is:

1. A method of removing carbonic acid component from sea water containing the same, which comprises adding milk of lime to sea water until it has a pH of about 10.0 to about 10.3, stirring the mixture, and then passing the resulting supersaturated solution of calcium carbonate and magnesium hydroxide upwardly through a sand layer at such a rate that the sand particles of the said layer are fluidized, for a contact period of about 5 to about 20 minutes.

2. A method of removing carbonic acid component from sea water containing the same, which comprises adding milk of lime to sea water in the proportion of 150 to 400 mgr. per one liter of sea water, stirring the mixture and then passing the resulting supersaturated solution of calcium carbonate and magnesium hydroxide upwardly through a sand layer containing sand particles with the particle size of 10 to 40 mesh and having a thickness of 5 to 7 m., at a flow rate of 0.5 to 0.7 m./min., thereby to have calcium carbonate selectively crystallized out on the surface of the sand particles fluidized.

3. A method of treating sea water for the recovery of magnesium hydroxide, which comprises adding milk of lime in an amount of at least equivalent to carbonic acid component contained in sea water to said sea water, immediately thereafter passing the resulting mixture upwardly through a sand layer at such a flow rate that the sand particles of the said layer are fluidized and for a contact period of 5 to 20 minutes, and then passing the treated sea water through a vacuum zone thereby to remove residual carbonic acid component, oxygen and nitrogen.

4. A method of removing carbonic acid component from sea water containing the same, which comprises adding milk of lime to sea water in an amount of more than equivalent to carbonic acid component contained therein and until a pH of about 10.15 to 10.20 is obtained, stirring the mixture and immediately thereafter passing the resulting supersaturated solution of calcium carbonate and magnesium hydroxide upwardly for a contact period of about 5 to 20 minutes through a sand layer consisting of particles of about 10 to 40 mesh at such a rate that the sand particles of the said layer are fluidized, whereby calcium carbonate is selectively crystallized out on the surface of the said sand particles, while the treated sea water together with substantially all magnesium hydroxide passes through said layer.

References Cited in the file of this patent

UNITED STATES PATENTS

| 1,505,202 | Judd | Aug. 19, 1924 |
| 2,070,125 | Hancock et al. | Feb. 9, 1937 |
| 2,355,564 | Sebald | Aug. 8, 1944 |
| 2,472,616 | Prescott et al. | June 7, 1949 |